United States Patent [19]

Yu et al.

[11] 4,367,265

[45] Jan. 4, 1983

[54] INTERGRANULAR INSULATION TYPE SEMICONDUCTIVE CERAMIC AND METHOD OF PRODUCING SAME

[75] Inventors: Chyang J. Yu, La Canada; Hem P. Takiar, Glendale, both of Calif.

[73] Assignee: North American Philips Corporation, New York, N.Y.

[21] Appl. No.: 251,593

[22] Filed: Apr. 6, 1981

[51] Int. Cl.³ .................. B32B 9/04; C04B 35/00
[52] U.S. Cl. .................. 428/697; 252/62.3 BT; 501/136; 428/699; 428/701
[58] Field of Search ............... 252/62.3 BT; 501/136; 428/697, 699, 701

[56] References Cited

U.S. PATENT DOCUMENTS

| | | | |
|---|---|---|---|
| 3,074,804 | 1/1963 | Planer et al. | 252/62.3 BT |
| 3,351,500 | 11/1967 | Khouri | 148/1.5 |
| 3,594,616 | 7/1971 | Nitto et al. | 317/230 |
| 3,933,668 | 1/1976 | Takahashi et al. | 252/63.5 |
| 4,143,207 | 3/1979 | Itakura et al. | 428/539 |

FOREIGN PATENT DOCUMENTS

| | | | |
|---|---|---|---|
| 2909098 | 9/1979 | Fed. Rep. of Germany | |
| 47-25955 | 7/1972 | Japan | 252/62.3 BT |
| 55-14665 | 2/1980 | Japan | 252/62.3 BT |
| 2026466 | 2/1980 | United Kingdom | |

OTHER PUBLICATIONS

"Studies on SrTiO3 Boundary Layer Dielectric," Yamaji et al, Review of the Elec. Comm. Labs, 20, Nos. 7-8, Jul.-Aug. 1972, pp. 747-763.
"Classification and Dielectric Characteristics of the Boundary Layer Ceramic Dielectrics (BL Dielectrics)," Waku et al, Rev. of the Elec. Comm. Labs, 19, Nos., 5-6, May-Jun. 1971, pp.665-679.

Primary Examiner—William R. Dixon, Jr.
Attorney, Agent, or Firm—Marc D. Schechter

[57] ABSTRACT

An intergranular insulation type semiconductive ceramic having a high effective dielectric constant includes an electrically insulating dielectric layer situated in the grain boundaries of an alkaline-earth metal titanate, zirconate, or combination thereof. The alkaline-earth metals are barium, strontium, and calcium. The dielectric layer is made of a mixture of bismuth oxide ($Bi_2O_3$) and one or more metal oxides from nickel oxide (NiO), alumina ($Al_2O_3$), and cuprous oxide ($Cu_2O$).

21 Claims, 2 Drawing Figures

INTERGRANULAR INSULATION TYPE SEMICONDUCTIVE CERAMIC AND METHOD OF PRODUCING SAME

BACKGROUND OF THE INVENTION

The invention relates to ceramic compositions having high effective dielectric constants for use in capacitors. More particularly, the invention relates to dielectric bodies of the intergranular insulation type and to methods of producing such dielectric bodies. A large effective dielectric constant is achieved in this type of structure by electrically insulating the grain boundaries of a conventional ceramic semiconductor with a material having a high dielectric constant.

The invention also relates to the production of semiconductive dielectric bodies, having electrically insulating dielectric materials at their grain boundaries, by coating the body with the insulating material and heating the coated body to diffuse the insulating material along the grain boundaries.

U.S. Pat. No. 3,933,668 discloses intergranular insulation type ceramic semiconductor compositions comprising a major portion of $SrTiO_3$, minor amounts of $Nb_2O_5$ or $Ta_2O_5$, and minor amounts of $GeO_2$ or $ZrO$. The ceramic has either (i) $Bi_2O_3$ or (ii) $Bi_2O_3$, PbO, and $B_2O_3$ diffused therein at the grain boundaries. The first ingredients are mixed, shaped into discs, and fired in a reducing atmosphere at, for example, 1350° C. to 1480° C. The fired discs are then coated with $Bi_2O_3$, alone or in combination with PbO and $B_2O_3$, and then sintered at, for example, 1300° C. for approximately two hours in an oxidizing atmosphere to diffuse the coating into the grain boundaries.

SUMMARY OF THE INVENTION

It is an object of the invention to provide new materials, for intergranular insulation of semiconductive dielectrics, in order to produce compositions having very high effective dielectric constants, low dissipation factors, and high resistivities over a wide temperature range.

The present invention provides an intergranular insulation type dielectric body based on a polycrystalline, semiconductive ceramic which is made of an alkaline-earth metal titanate, zirconate, or combination thereof. The alkaline-earth metal is one or more of barium, strontium, and calcium. An electrically insulating dielectric layer is provided at the grain boundaries of the ceramic body. The electrically insulating dielectric is made of a combination of $Bi_2O_3$ and one or more metal oxides. The metal oxides are NiO, $Al_2O_3$, and $Cu_2O$. Where the electrically insulating dielectric layer consists solely of $Bi_2O_3$ and $Cu_2O$, the ratio of $Cu_2O$ to $Bi_2O_3$ is less than 1.5% by weight but greater than 0%.

The present invention also provides a method of manufacturing an intergranular insulation type dielectric body from a polycrystalline, semiconductive ceramic body as described above. According to the method of the invention, at least a part of the surface of the ceramic body is coated with a mixture of $Bi_2O_3$ and one or more metal oxides. The metal oxides are NiO, $Al_2O_3$ and $Cu_2O$. Where the coating consists solely of $Bi_2O_3$ and $Cu_2O$, the ratio of $Cu_2O$ to $Bi_2O_3$ is less than 1.5% by weight but greater than 0%.

DESCRIPTION OF THE PREFERRED EMBODIMENTS

Figure 1:
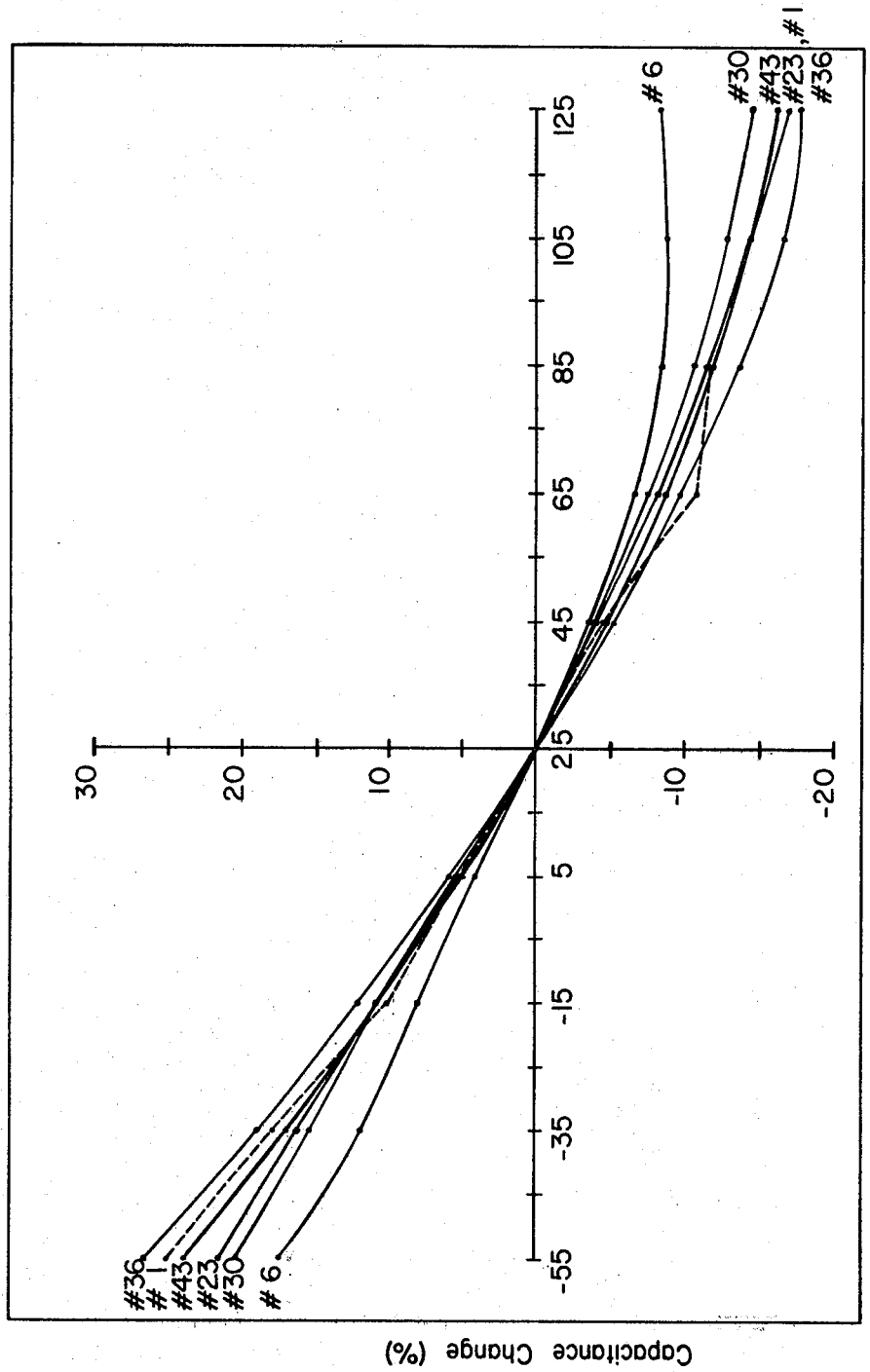
FIG. 1 is a graph showing the change in capacitance of samples 1, 6, 23, 30, 36 and 43 as a function of temperature.

An intergranular insulation type dielectric body according to the invention includes a polycrystalline, semiconductive ceramic body and an electrically insulating dielectric layer situated in the grain boundaries of the ceramic. For the purposes of the present invention, suitable ceramics include alkaline-earth metal titanates, zirconates or combinations thereof. Suitable alkaline-earth metals include barium, strontium, and calcium. The preferred ceramic material is, however, strontium titanate ($SrTiO_3$).

Although suitable ceramics may consist solely of strontium titanate, silicon dioxide ($SiO_2$) and strontium carbonate ($SrCO_3$) can be added to the ceramic in order to control the sintering behavior of the ceramic and the grain size and size distribution of the ceramic. Other permissible additions to the ceramic include niobium pentoxide ($Nb_2O_5$) and tantalum pentoxide ($Ta_2O_5$), which are n-type dopants, for increasing the conductivity of the ceramic. These latter two additions also affect the sintering behavior of the ceramic.

Although the present invention can be used in connection with all of the ceramic materials described above, in the following examples the ceramic material consists of strontium titanate, strontium carbonate, niobium pentoxide, and silicon dioxide.

More particularly, in the following examples the ceramic material was made from:

1382 grams $SrTiO_3$ (98.67 weight percent);
0.79 grams $SrCO_3$ (0.056 weight percent);
15.14 grams $Nb_2O_5$ (1.081 weight percent);
2.71 grams $SiO_2$ (0.193 weight percent);

The ceramic material was prepared from these compounds by mixing them thoroughly into slurry form. Sheets were cast from the slurry and pressed into discs having a diameter of 10 millimeters and having a thickness of 0.64 millimeters. The discs were then sintered at 1440° C. for four hours in a reducing atmosphere consisting of 6% $H_2$ and 94% $N_2$. Semiconductive ceramic discs having a diameter of 8.6 millimeters and having a thickness of 0.55 millimeters were obtained.

EXAMPLE 1

Different quantities (0 to 4 grams) of cuprous oxide ($Cu_2O$) were mixed with 20 grams of bismuth oxide ($Bi_2O_3$) in order to obtain $Cu_2O/Bi_2O_3$ weight ratios of between 0% and 20%. These mixtures were each fired at 850° C. for two hours. Frits having different ratios of $Cu_2O/Bi_2O_3$ were thus obtained.

The semiconductive ceramic discs described above were then coated with 10 weight % of $Cu_2O$-$Bi_2O_3$ frit on one side. The coated discs were heat treated at 1150° C. for 2½ hours in air to cause the frit material to diffuse along the grain boundaries throughout the discs. Silver electrodes were then applied to both sides of the discs. The dielectric properties of these discs are shown in Table I. In Table I, and Tables II–V, all measurements were made at 1 kilohertz, except for the resistivity which was measured with a direct current. In addition, all measurements were made at 25° C. unless otherwise indicated.

TABLE I

| Sample No. | $Cu_2O/Bi_2O_3$ (wt %) | $\epsilon_{eff}$ | tan δ (%) | ρ50V, 2 min (ohm-cm) |
|---|---|---|---|---|
| 1 | 0 | 26,100 | 0.4 | $4.0 \times 10^{10}$ |
| 2 | .005 | 42,800 | 0.3 | $6.6 \times 10^{9}$ |
| 3 | .01 | 36,400 | 0.4 | $8.6 \times 10^{9}$ |
| 4 | .05 | 50,500 | 0.3 | $4.4 \times 10^{9}$ |
| 5 | .1 | 48,500 | 0.4 | $9.6 \times 10^{9}$ |
| 6 | .5 | 54,900 | 0.1 | $4.8 \times 10^{10}$ |
| 7 | 1.0 | 38,400 | 0.6 | $2.7 \times 10^{10}$ |
| 8 | 2.0 | 41,100 | 0.2 | $1.3 \times 10^{11}$ |
| 9 | 3.0 | 35,400 | 1.5 | $1.8 \times 10^{10}$ |
| 10 | 5.0 | 26,800 | 3.9 | $1.7 \times 10^{9}$ |
| 11 | 10.0 | 22,900 | 8.2 | $1.2 \times 10^{8}$ |
| 12 | 20.0 | 25,100 | 12.1 | $2.2 \times 10^{7}$ |

EXAMPLE 2

Frits having $Cu_2O/Bi_2O_3$ weight ratios of between 0% and 1.5% were prepared the same way as in Example 1. Ceramic discs having the composition described above were then coated with 10 weight % of $Cu_2O$-$Bi_2O_3$ frit on one side thereof. The coated discs were heat treated at 1100° C. for 2½ hours in air. Silver electrodes were then applied to both sides of the discs. The dielectric properties of the discs are shown in Table II.

TABLE II

| Sample No. | $Cu_2O/Bi_2O_3$ (wt %) | $\epsilon_{eff}$ | tan δ (%) | ρ50V, 2 min (ohm-cm) |
|---|---|---|---|---|
| 13 | 0 | 32,200 | 0.4 | $3.3 \times 10^{8}$ |
| 14 | .005 | 36,600 | 0.1 | $4.9 \times 10^{8}$ |
| 15 | .01 | 37,400 | 0.2 | $9.1 \times 10^{8}$ |
| 16 | .05 | 35,600 | 0.1 | $4.6 \times 10^{9}$ |
| 17 | .1 | 34,700 | 0.6 | $4.6 \times 10^{9}$ |
| 18 | .5 | 36,200 | 0.2 | $4.6 \times 10^{9}$ |
| 19 | 1.0 | 36,900 | 0.3 | $9.2 \times 10^{8}$ |
| 20 | 1.5 | 30,500 | 0.4 | $7.6 \times 10^{9}$ |

EXAMPLE 3

Different quantities (0 to 1.2 grams) of nickel oxide (NiO) were mixed with 20 grams of bismuth oxide in order to obtain $NiO/Bi_2O_3$ weight ratios of between 0% and 6%. These mixtures were fired at 850° C. for two hours. Frits having different ratios of $NiO/Bi_2O_3$ were thus obtained.

Ceramic discs, having the composition described above, were then coated with 10 weight % of the NiO-$Bi_2O_3$ frit on one side. The coated discs were heat treated at 1150° C. for 2½ hours in air. Silver electrodes were then applied to both sides of the discs. The dielectric properties of these discs are shown in Table III.

TABLE III

| Sample No. | $NiO/Bi_2O_3$ (wt %) | $\epsilon_{eff}$ | tan δ (%) | ρ50V, 2 min (ohm-cm) |
|---|---|---|---|---|
| 1 | 0 | 26,100 | 0.4 | $4.0 \times 10^{10}$ |
| 21 | .05 | 22,700 | 0.3 | $6.5 \times 10^{10}$ |
| 22 | .1 | 30,700 | 0.2 | $3.1 \times 10^{10}$ |
| 23 | .5 | 33,600 | 0.2 | $6.6 \times 10^{10}$ |
| 24 | 1 | 32,600 | 0.2 | $1.3 \times 10^{11}$ |
| 25 | 2 | 28,700 | 1.0 | $1.2 \times 10^{9}$ |
| 26 | 3 | 26,900 | 3.0 | $3.3 \times 10^{7}$ |
| 27 | 6 | 27,500 | 2.5 | $3.3 \times 10^{8}$ |

EXAMPLE 4

Different quantities (0 to 0.6 grams) of alumina ($Al_2O_3$) were mixed with 20 grams of bismuth oxide in order to obtain $Al_2O_3/Bi_2O_3$ weight ratios of between 0% and 3%. These mixtures were then fired at 850° C. for two hours. Frits having different ratios of $Al_2O_3/Bi_2O_3$ were thus obtained.

Ceramic discs having the composition described above were then coated with 10 weight % of the $Al_2O_3$-$Bi_2O_3$ frit on one side. The coated discs were heat treated at 1150° C. for 2½ hours in air. Silver electrodes were then applied to both sides of the discs. The dielectric properties obtained are shown in Table IV.

TABLE IV

| Sample No. | $Al_2O_3/Bi_2O_3$ (wt %) | $\epsilon_{eff}$ | tan δ (%) | ρ50V, 2 min (ohm-cm) |
|---|---|---|---|---|
| 1 | 0 | 26,100 | 0.4 | $4.0 \times 10^{10}$ |
| 28 | .05 | 20,100 | 0.4 | $8.0 \times 10^{10}$ |
| 29 | .1 | 20,900 | 0.5 | $1.0 \times 10^{11}$ |
| 30 | .5 | 25,600 | 0.5 | $4.9 \times 10^{10}$ |
| 31 | 1.0 | 20,500 | 0.8 | $7.4 \times 10^{10}$ |
| 32 | 1.5 | 15,500 | 2.5 | $5.0 \times 10^{10}$ |
| 33 | 3.0 | 12,100 | 2.0 | $5.1 \times 10^{10}$ |

EXAMPLE 5

Different quantities of $Cu_2O$, $Al_2O_3$ and NiO were mixed with 20 grams of bismuth oxide in order to obtain $(Al_2O_3+Cu_2O+NiO)/Bi_2O_3$ weight ratios of between 0% and 1.5%. These mixtures were fired at 850° C. for two hours to obtain frits.

Ceramic discs having the composition described above were then coated with 10 weight % of the frit on one side. The coated discs were heat treated at 1150° C. for 2½ hours in air. Silver electrodes were then applied to both sides of the discs. The dielectric properties obtained are shown in Table V.

TABLE V

| Sample No. | $Cu_2O/Bi_2O_3$ (wt %) | $Al_2O_3/Bi_2O_3$ wt %) | $NiO/Bi_2O_3$ (wt %) | $\epsilon_{eff}$ | tan δ (%) | ρ50V, 2 min (ohm-cm) |
|---|---|---|---|---|---|---|
| 1 | 0 | 0 | 0 | 26,100 | 0.4 | $4.0 \times 10^{10}$ |
| 34 | 0.25 | 0 | 0.05 | 30,000 | 0.3 | $1.8 \times 10^{11}$ |
| 35 | 0.25 | 0 | 0.5 | 29,000 | 0.3 | $1.1 \times 10^{11}$ |
| 36 | 0.05 | 0 | 0.05 | 33,000 | 0.4 | $1.2 \times 10^{11}$ |
| 37 | 0.05 | 0 | 0.5 | 27,000 | 0.5 | $1.0 \times 10^{11}$ |
| 38 | 0.005 | 0 | 0.05 | 29,000 | 0.4 | $6.0 \times 10^{10}$ |
| 39 | 0.005 | 0 | 0.5 | 31,000 | 0.5 | $5.0 \times 10^{10}$ |
| 40 | 1.0 | 0 | 0.05 | 29,000 | 0.4 | $9 \times 10^{10}$ |
| 41 | 1.0 | 0 | 0.5 | 28,000 | 0.5 | $9 \times 10^{10}$ |
| 42 | 0.25 | 0.025 | 0 | 25,000 | 0.4 | $1.5 \times 10^{11}$ |
| 43 | 0.25 | 0.05 | 0 | 35,000 | 0.4 | $3.8 \times 10^{10}$ |
| 44 | 0.25 | 0.25 | 0 | 26,000 | 0.4 | $1.0 \times 10^{11}$ |

In the above examples, acceptable results are achieved for the $Cu_2O$-$Bi_2O_3$ frit where the weight ratio of $Cu_2O/Bi_2O_3$ is between 0 and 1.5%. For the NiO-$Bi_2O_3$ and $Al_2O$-$Bi_2O_3$ systems the preferred weight ratios are 0-2 and 0-1.5 weight %, respectively. For mixtures of frits, the preferred weight ratio is between 0 and 1.5 weight %.

Table VI shows the frequency dependence of both the capacitance and the loss factor for Sample Number 6. These dielectric properties are clearly shown to be very stable with respect to frequency changes.

TABLE VI

| Capacitance (nF) | (ΔC/C) | tanδ (%) | Frequency |
|---|---|---|---|
| 38.2 | +0.5% | 0.6 | 120 Hz |
| 38.0 | | 0.3 | 1 KHz |
| 37.8 | −0.5% | 0.3 | 10 KHz |
| 37.8 | −0.5% | 0.3 | 20 KHz |
| 37.75 | −0.7% | 0.3 | 40 KHz |
| 37.7 | −0.8% | 0.3 | 100 KHz |
| 37.65 | −0.9% | 0.3 | 200 KHz |
| 37.6 | −1.0% | 0.4 | 400 KHz |
| 37.8 | −0.5% | 0.4 | 1.0 MHz |
| 39.2 | +3.2% | 0.7 | 2.0 MHz |

FIG. 1 is a graph of the percent change in capacitance as a function of temperature for Sample Nos. 1, 6, 23, 30, 36, and 43. By inspection of this graph it is apparent that Samples Nos. 6 and 30 meet or exceed EIA (Electronic Industries Association) type designation code Y7R. All of the samples exceed EIA type designation codes Z5U and Y7S.

Figure 2:
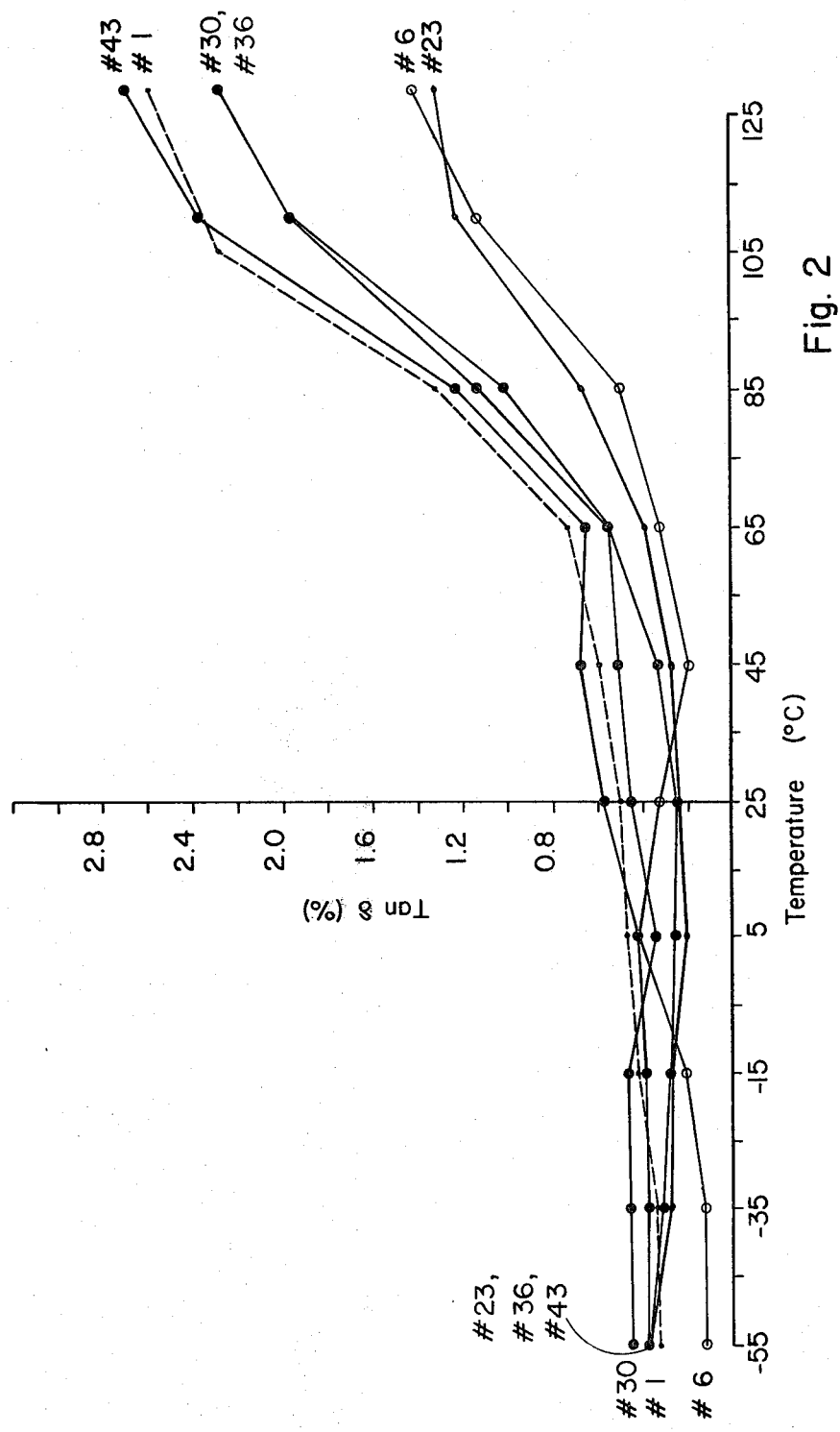
FIG. 2 is a graph showing the loss factor of samples 1, 6, 23, 30, 36, and 43 as a function of temperature.

FIG. 2 is a graph showing the temperature dependence of the loss factor of Samples Nos. 1, 6, 23, 30, 36, and 43. All of the samples show acceptably low loss over the entire temperature range of −55° to +125° C.

What is claimed:

1. An intergranular insulation type dielectric body comprising:
a polycrystalline, semiconductive ceramic having grain boundaries, said ceramic comprising an alkaline-earth metal titanate, zirconate, or a combination thereof, said alkaline-earth metal comprising one or more of barium, strontium, and calcium; and
an electrically insulating dielectric layer situated in the grain boundaries of the ceramic;
characterized in that the electrically insulating layer comprises $Bi_2O_3$ and NiO.

2. A dielectric body as claimed in claim 1, characterized in that in the electrically insulating dielectric layer, the ratio of NiO to $Bi_2O_3$ is less than 2% by weight but is greater than 0%.

3. An intergranular insulation type dielectric body comprising:
a polycrystalline, semiconductive ceramic having grain boundaries, said ceramic comprising an alkaline-earth metal titanate, zirconate, or a combination thereof, said alkaline-earth metal comprising one or more of barium, strontium, and calcium; and
an electrically insulating dielectric layer situated in the grain boundaries of the ceramic;
characterized in that the electrically insulating layer comprises $Bi_2O_3$ and $Al_2O_3$.

4. A dielectric body as claimed in claim 3, characterized in that in the electrically insulating dielectric layer, the ratio of $Al_2O_3$ to $Bi_2O_3$ is less than 1.5% by weight but is greater than 0%.

5. An intergranular insulation type dielectric body comprising:
a polycrystalline, semiconductive ceramic having grain boundaries, said ceramic comprising an alkaline-earth metal titanate, zirconate, or a combination thereof, said alkaline-earth metal comprising one or more of barium, strontium, and calcium; and
an electrically insulating dielectric layer situated in the grain boundaries of the ceramic;
characterized in that the electrically insulating layer comprises $Bi_2O_3$ and $Cu_2O$, the ratio of $Cu_2O$ to $Bi_2O_3$ being less than 1.5% by weight but greater than 0%.

6. An intergranular insulation type dielectric body comprising:
a polycrystalline, semiconductive ceramic having grain boundaries, said ceramic comprising an alkaline-earth metal titanate, zirconate, or a combination thereof, said alkaline-earth metal comprising one or more of barium, strontium, and calcium; and
an electrically insulating dielectric layer situated in the grain boundaries of the ceramic;
characterized in that the electrically insulating layer comprises $Bi_2O_3$ and two or more metal oxides from the group comprising $Cu_2O$, $Al_2O_3$, and NiO.

7. A dielectric body as claimed in claim 6, characterized in that in the electrically insulating dielectric layer, the ratio of metal oxide to $Bi_2O_3$ is less than 1.5% by weight but is greater than 0%.

8. A dielectric body as claimed in claim 1, 2, 3, 4, 5, 6, or 7, characterized in that the semiconductive ceramic comprises $SrTiO_3$.

9. A dielectric body as claimed in claim 8, characterized in that the semiconductive ceramic further comprises $Nb_2O_5$ or $Ta_2O_5$.

10. A dielectric body as claimed in claim 9, characterized in that the semiconductive ceramic further comprises $SiO_2$ and $SrCO_3$.

11. A dielectric body as claimed in claim 10, characterized in that the semiconductive ceramic is made from 98.67 weight percent $SrTiO_3$, 0.056 weight percent $SrCO_3$, 1.081 weight percent $Nb_2O_5$ and 0.193 weight percent $SiO_2$.

12. A method of manufacturing an intergranular insulation type dielectric body from a polycrystalline, semiconductive ceramic body having grain boundaries, said ceramic comprising an alkaline-earth metal titanate, zirconate, or a combination thereof, said alkaline-earth metal comprising one or more of barium, strontium, and calcium, said method comprising the steps of:
coating at least a part of the surface of the ceramic body with a mixture of $Bi_2O_3$ and NiO; and
diffusing the coating into the grain boundaries of the ceramic body.

13. A method as claimed in claim 12, characterized in that the ratio of NiO to $Bi_2O_3$ in the coating is less than 2% by weight but is greater than 0%.

14. A method of manufacturing an intergranular insulation type dielectric body from a polycrystalline, semiconductive ceramic body having grain boundaries, said ceramic comprising an alkaline-earth metal titanate, zirconate, or a combination thereof, said alkaline-earth metal comprising one or more of barium, strontium, and calcium, said method comprising the steps of:
coating at least a part of the surface of the ceramic body with a mixture of $Bi_2O_3$ and $Al_2O_3$; and
diffusing the coating into the grain boundaries of the ceramic body.

15. A method as claimed in claim 14, characterized in that the ratio of $Al_2O_3$ to $Bi_2O_3$ in the coating is less than 1.5% by weight but is greater than 0%.

16. A method of manufacturing an intergranular insulation type dielectric body from a polycrystalline, semiconductive ceramic body having grain boundaries, said ceramic comprising an alkaline-earth metal titanate, zirconate, or a combination thereof, said alkaline-earth metal comprising one or more of barium, strontium, and calcium, said method comprising the steps of:

coating at least a part of the surface of the ceramic body with a mixture of $Bi_2O_3$ and $Cu_2O$, the ratio of $Cu_2O$ to $Bi_2O_3$ being less than 1.5% by weight but greater than 0%; and diffusing the coating into the grain boundaries of the ceramic body.

17. A method as claimed in claim 12, 13, 14, 15, or 16, characterized in that the coating is an amorphous frit.

18. A method as claimed in claim 17, characterized in that the diffusing step comprises heating the coated ceramic body in air.

19. A method as claimed in claim 18, characterized in that the coated ceramic body is heated to approximately 1100°–1150° C. for approximately 2.5 hours.

20. A method as claimed in claim 19, characterized in that the initial ceramic body comprises $SrTiO_3$.

21. A method as claimed in claim 20, characterized in that the ratio of the quantity of coating to ceramic material is approximately 10 weight %.

* * * * *